(12) United States Patent
Knowlton

(10) Patent No.: US 6,225,403 B1
(45) Date of Patent: May 1, 2001

(54) METHOD AND COMPOSITION FOR TREATING FIBROUS SUBSTRATES TO IMPART OIL, WATER AND DRY SOIL REPELLENCY

(76) Inventor: Barry R. Knowlton, 22 Deloraine Drive, Brampton, Ont. (CA), L6T-1T4

( * ) Notice: Subject to any disclaimer, the term of this patent is extended or adjusted under 35 U.S.C. 154(b) by 0 days.

(21) Appl. No.: 09/243,019

(22) Filed: Feb. 3, 1999

(51) Int. Cl.[7] .................. C08J 83/06; C08J 3/02; C08L 27/12; C08L 43/04
(52) U.S. Cl. .................. 524/858; 524/501; 524/520; 524/805; 524/806; 524/863
(58) Field of Search ................... 524/492, 493, 524/501, 805, 806, 839, 858, 520

(56) References Cited

U.S. PATENT DOCUMENTS

| | | |
|---|---|---|
| 4,555,419 * | 11/1985 | Huhn et al. ............ 427/387 |
| 5,321,083 | 6/1994 | Hanada . |
| 5,431,852 | 7/1995 | Kaijou . |
| 5,520,962 * | 5/1996 | Jones, Jr. .............. 427/393.4 |
| 5,536,304 | 7/1996 | Coppens . |
| 5,602,225 | 2/1997 | Montagna . |
| 5,616,645 * | 4/1997 | Kuwamura et al. ........ 524/546 |
| 5,712,335 * | 1/1998 | Tsuda et al. ............ 524/269 |
| 5,792,711 | 8/1998 | Roberts . |
| 5,854,342 * | 12/1998 | Kirochko et al. ......... 524/805 |
| 6,005,043 * | 12/1999 | Zhu ..................... 524/493 |

* cited by examiner

Primary Examiner—Edward J. Cain
Assistant Examiner—Katarzyna Wyrozebski-Lee
(74) Attorney, Agent, or Firm—D. Peter Hochberg; Katherine R. Vieyra; William H. Holt

(57) ABSTRACT

The present invention relates to a method and composition for treating textile fibers or substrates, to thereby impart oil, water and soil repellency at substantially reduced add on levels of fluorine containing resins based on weight of the textile fiber or substrate so treated.

19 Claims, No Drawings

METHOD AND COMPOSITION FOR TREATING FIBROUS SUBSTRATES TO IMPART OIL, WATER AND DRY SOIL REPELLENCY

BACKGROUND OF THE INVENTION

The present invention relates to a method and composition for treating fibrous substrates, to thereby impart oil, water and soil repellency at substantially reduced add on levels of typical fluorochemical products useful in imparting those properties. Fluorochemicals are generally comprised of at least one fluorine containing resin and at least one non-fluorine containing resin which when co-applied to a fibrous substrate provide a durable film on the surface of the fibrous substrate the film may be either continuous or discontinuous in nature so as to cover all or part of the surface of the fibrous substrate.

In this disclosure it is of particular importance to distinguish the differences that exist between the terms A) soil repellency B) oil repellency and C) water repellency, as they relate to textiles.

A) Soil repellency refers to the ability of a fibrous substrate to resist the adhesion of dry soils. The tests performed to evaluate soiling performance levels generally involve applying standardized non liquid containing dry soil compositions to a fibrous substrate and further subjecting it to a moving load to simulate wear or trafficking and subsequently submitting the soiled substrate to a specified soil removal process, such as vacuuming. These tests may also involve water extracting. The substrate is then compared to a control sample or standard of established value.

B) Oil repellency refers to the degree to which a substrate repels liquids of this type. Typically AATCC test method 118-1983 is used to determine oil repellency values from '1' to '8' where in '8' is the highest repellency rating.

C) Water repellency refers to the degree to which a substrate repels water and water/isopropanol mixtures and is determined using a similar method to that for oil repellency.

The extensive and preferred application of fluorochemicals to provide fibrous substrates with water, oil and soil repellency has led to the use of oil and water repellency values to be deemed directly proportional to soil repellency values and this is often not true.

The significance of each type of repellency value is for example, directly related to the type of repellency required for a particular textile end use. An awning type material that is exposed to the elements will derive maximum benefit from a high level of water repellency and a low to no oil repellency level but to maintain an acceptable appearance it should be provided with high soil repellency. Surgical gowns, masks and other such clothing, which are for the most part disposable, require high levels of oil and water repellency to prevent liquid penetration but require little if any soil repellency. Carpeting on the other hand requires moderate levels of oil and water repellency to fend off occasional spills but requires the highest level possible of soil repellency to promote effective and easy maintenance.

The diverse end use requirements for oil, water and soil repellency has led to a wide variety of fluorochemicals being developed. They provide a wide variation in the type of protection and levels of protection offered. It is therefore of major benefit to have a range of fluorochemical products which at point of application to a fibrous substrate can be provided with admixture components and process parameters that will reduce by up to 60% the quantity of fluorochemicals required to obtain certain specified levels of oil, water, and soil repellency.

It is the focus of this disclosure to provide a method and compositions for treating fibrous substrates whereby the amount of fluorochemicals required may be reduced by up to 60% while maintaining specified levels of repellency for a given fibrous substrate.

Processes have already been described such as in Canadian Patents Nos. 832,401 of Bey issued Jan. 20, 1970 and 830,886 of Mohrlok et al issued Dec. 30, 1969 and German published specification DE-OS No. 1,594,985 for treating fibrous substrates to render them repellent to dry soil by applying thereto a colloidal suspension of silsesquioxanes which consist of R $SiO_{3/2}$ units and have a particle size of 10 to 1,000 Angstroms.

U.S. Pat. No. 4,351,736 of Steinberger et al issued September 28, 1982, further provides for a textile impregnating agent useful for pile stabilization and a process for its preparation comprising a colloidal suspension of a silicic acid with $SiO_2$ units and organosilsesquioxanes having units of the formula R $SiO_{3/2}$ wherein R is an alkyl or aryl radical with up to 7 carbon atoms and an average particle size of about 200 to 500 Angstroms and wherein the solids range from about 2% to about 9% by weight. This U.S. patent also teaches that the same textile impregnating agent provides significantly higher levels of soil repellency than that provided by DE-OS No. 1,594,985 type agents.

U.S. Pat. No. 4,781,844 of Kortmann et al issued November 1, 1988, describes further use of colloidal suspensions of organosilsesquioxanes described in U.S. Pat. No. 4,351,736 by combining those colloidal suspensions in specific ratios with certain perfluoroalkyl group containing resins within a specified range of resin solids content, to provide a textile finishing agent which, when diluted in and applied to a textile substrate and dried at elevated temperature, results in improved oil, water and soil repellency, over and above that of the described fluorochemical resins when applied in the same weight percent to a fibrous substrate without the addition of the described organosilsesquioxanes. This patent makes no reference to the possibility of fluorochemical reduction, based on weight of the fibrous substrate, resulting from the application of the prepared fibrous substrate finishing agent comprised of certain specified materials, in fixed ratios of weight percent to one another.

SUMMARY OF THE INVENTION

According to the present invention it has been discovered that an aqueous sol dispersion comprising solid organosiloxane co-polymers consisting of R $SiO_{3/2}$ units and/or $R'_2$ SiO units and/or $R''_3$ $SiO_{1/2}$ units wherein each of R, R', R" is from the group consisting of hydrocarbon and substituted hydrocarbon radicals containing from 1 to 7 carbon atoms and having an overall particle size range of from about 10 Angstroms to about 2,000 Angstroms and about 5% to about 26% typical solids by weight, when applied to a fibrous substrate according to the method herein after described in fact provides for substantial reductions in the amount of fluorochemical required to impart oil, water and soil repellency levels as specified by the intended end use of a particular fibrous substrate.

More particularly, in accordance with the present invention there is provided a method of treating fibrous substrates to thereby impart oil, water and dry soil repellency at substantially reduced add on levels of fluorochemicals based on the weight of a fibrous substrate so treated. The method comprises the steps of applying an aqueous treating medium comprising an admixture of:

(a) 0.1 to 35 parts by weight of an aqueous colloidal sol dispersion containing from about 5% to about 26% by weight solid organosilsesquioxane co-polymers having units selected from the group consisting of $R\ SiO_{3/2}$, $R'_2\ SiO$ and $R''_3\ SiO_{1/2}$ units, wherein each R, R' and R" radical is selected from the group consisting of hydrocarbon and substituted hydrocarbon radicals containing from 1 to 7 carbon atoms, the co-polymers having an overall particle size range of from about 10 Angstroms to about 2000 Angstroms in a sufficient amount to yield from 0.04% to 0.32% solids based on the weight of the fibrous substrate to which it is applied;

(b) from 0.00 to about 0.96 parts by weight of solids of fluorochemical resins selected from the group of liquids containing at least one dispersed or emulsified fluorine containing resin, added as an aqueous fluorochemical dispersion or emulsion wherein the fluorine content of the resin is from about 15% to 50% by weight in a sufficient amount to yield from about 100 parts per million to about 500 parts per million fluorine atom on the fibre; and (c) 64.04 parts to 99.9 parts by weight of a diluent, and then heating the fibrous material to cause curing of resin components so applied.

In a preferred embodiment of the present invention, incorporated in the diluent is an effective amount of fibrous substrate agent selected from the group consisting of leveling agents, anti foams, foaming agents, stain blockers, spin finish, acids, bases and salts.

It will be understood that the solid organosiloxane co-polymers materials themselves do not produce water or oil repellency. Their presence however in the treating medium for the fibrous substrate extends the repellency qualities of the fluorochemical resins so that significant reductions in the amounts of fluorochemical resins used, to achieve comparable repellency on the substrate are significantly reduced.

DETAILED DESCRIPTION OF THE INVENTION

Some terms used within this disclosure are further listed and defined hereunder as an aid to the reader.

| | |
|---|---|
| ANGSTROM | Unit of measurement equivalent to 0.0001 microns or 0.1 nanometers |
| FIBROUS SUBSTRATE | any kind of natural or synthetic fibre for use in, for example in carpets, clothing, industrial fabrics, seatbelts and upholstery |
| LOW WET PICK UP PADDING | method for applying liquids containing textile agents, to a textile material by immersing the material in the liquid and removing excess liquid by mechanical means to yield a specified percent wet pick up on the material, normally less than 100% wet pick up. The agents may be exhausted onto the material and spent liquid extracted or simply dried intact by heating. |
| HIGH WET PICK UP PADDING | method for applying liquids, containing textile agents, to a textile material by metering specific quantities of a liquid onto and into the material to obtain a specific percent wet pick up, normally from 150% to 450% wet pick up. The agents are exhausted from the liquid onto the material in a heating process and subsequently the spent liquid is extracted from the material. |
| FLURO-CHEMICAL RESIN | any liquid containing at least one dispersed or emulsified fluorine containing resin. The liquid may also contain other non fluorine containing resins or compounds. These liquids are useful in imparting oil repellency, water repellency or soil repellency or any combination of such repellencies to a fibrous substrate to which they may be applied. |
| SOIL REPELLENCY | resistance to soiling, soil resistance. |
| DIRECT APPLICATION | any method of applying liquids containing textile agents whereby the fibre or substrate is brought to a dry state by evaporating the liquids applied thereto. i.e. topical spray and foam applications etc. |
| INDIRECT APPLICATION | any method of applying liquids containing textile agents whereby the textile agents are applied to the fibrous substrate from the liquid and the liquid is for the most part removed from the fibrous substrate before drying or further processing. |
| TOPICAL FOAM APPLICATION | method of applying liquids containing textile agents to a textile material by further addition of a foaming agent to the liquid and causing air to be passed into the liquid in such a manner as to cause the entrapment of air bubbles, thereby creating a foam which is evenly applied over the surface of a textile material and subsequently caused to uniformly collapse into the material, normally at from 15 to 40 percent wet pick up. |
| TOPICAL SPRAY APPLICATION | method for applying liquids, containing textile agents to a textile material by forcing liquids under pressure through a nozzle to provide a continuous atomized liquid spray applied to the surface of a textile material normally at from 5 to 25 percent wet pick up. |
| SPIN FINISH | any liquid and material carried by the liquid applied to textile fibre prior to or during its conversion into a finished yarn. Normally a spin finish provides lubrication and antistatic properties necessary for processing. |
| SOL | a solid dispersed in a liquid medium |
| STAIN BLOCKER (SB) | any textile agent or agents which when applied to fibrous substrate provide resistance to staining by acid food colours, (also referred to as stain resistance chemistry and stain resists). |
| WET PICK UP (WPU) | a term used to express the weight of a liquid and material carried by the liquid applied to a fibrous substrate in relation to the dry weight of said fibrous substrate normally expressed as a percent. i.e. 100 g of liquid applied to 100 g of material = 100% wet pick up. |

Fluorochemical resins as supplied to the textile industry for the purpose of imparting oil, water or soil repellency or a combination of said repellencies, are generally of sufficient active content to be applied to a textile fibre at from about 0.25% to about 1.0% based on weight of fibrous substrate.

It is further generally accepted that the resultant fluorine deposited onto a fibrous substrate from the application thereto of a fluorochemical resin, to provide acceptable to high, combined oil, water and soil repellency, will range from about 300 to about 500 parts per million by weight.

The method and composition for treating fibrous substrates in accordance with the present invention, is intended for fibrous substrates that normally derive an original marketable benefit of:

a) enhanced soil repellency values or b) enhanced water repellency values or c) enhanced oil repellency values or d) any combination of a), b), or c)

from the application there to of a fluorochemical resin in an amount based on weight of said fibrous substrate and may, by the use of said method and compositions further derive a financial or other marketable benefit from a reduction in the amount of fluorochemical resin used of from about 30% to about 60% based on weight of said fluorochemical resin, while maintaining or improving the original marketable repellency benefits.

In order to provide accurate demonstrations of fluorochemical resin reductions based on the weight of fibrous substrates it is necessary to assure that the fluorochemical resin is evenly applied to the entire fibrous substrate and not to a portion thereof, such as is common practice in many textile operations. High pile fibrous substrates such as carpeting for example normally make use of topical spray or topical foam applications of fluorochemical resin and such application techniques seldom apply fluorochemical to more than 75% of the fibrous substrate. As well, the consistency of penetration into the substrate can vary widely within any particular production run. It is therefore somewhat difficult to provide accurate data based on weight of fibrous substrate using these application techniques, however using direct comparative test data from such techniques while still referencing fibrous substrate weight will demonstrate the practical usefulness of this invention in its broadest terms of reducing the quantity of fluorochemical resin or resins required to achieve a particular level of repellency.

Fibrous substrate manufacturers and yarn converters on the other hand rely on even and consistent applications of lubricants, coding tints and fluorochemical resins which are added in specific amounts based on weight of the fibre or yarn. The method and composition of this invention makes use of typical fibre or fibrous substrate processing procedures or both to achieve significantly reduced overall add-on levels of fluorochemical resins based on weight of fibrous substrate.

The method as it applies to a textile fibre may be practiced by application of the composition within a spin finish that is either metered or sprayed onto a fibre or yarn and is subsequently subjected to elevated temperatures sufficient to cure the fluorochemical resins contained therein, such as those attained in the drawing, texturizing or heatsetting processes, before further manufacturing into a fibrous substrate such as carpet, furniture fabric or garment etc. The substrate, containing fibres or yarns so processed, may have as a final step, a further application of one or more of the disclosed components of the composition providing that certain limiting overall weight percentages of said organosiloxane co-polymers on weight of fibre or yarn are maintained within the disclosed range.

The method of this invention as it applies to a textile substrate may be practiced by: exhaustion from a liquor, low wet pick up padding, high wet pick up padding, topical spray, topical foam or a combination of such processes providing the substrate is subsequently subjected to elevated temperatures prior to any further wet processing and that certain limiting overall weight percentages of said described organosiloxane co-polymer units on weight of substrate are maintained within the disclosed range. The method and composition allows for co-application with other textile agents imparting or providing other properties to a fibrous substrate, such as stain resistance, wrinkle resistance, UV protection, hand modification, colour, etc. Certain textile agents in fact enhance the repellencies when co-applied.

The following is a summary of textile agents used in demonstrating this invention.
Fluorochemicals
F1—Type FX-1367* Anionic Electrochemically Fluorinated, Flurorpolymer
Emulsion
Sold by 3M Specialty Chemical Division.
Approximately 41% solids
Approximately 59% medium
F2—Type TG-3020* Anionic Fluoropolymer Emulsion
Sold by Daikin Industries Ltd.
Approximately 30% solids
Approximately 70% medium
F3—Type TG232D* Nonionic, Fluoroalkyl Acrylate, Fluoropolymer Emulsion
Sold by Advanced Polymers Inc.
Approximately 30% solids
Approximately 70% medium
Trade-mark
F4—Type APG-160* Cationic Fluoropolymer Emulsion
Sold by Advanced Polymers, Inc.
Approximately 22% solids
Approximately 78% medium
F5—Type APG-559* Cationic Fluoropolymer Emulsion
Sold by Advanced Polymers, Inc.
Approximately 30% solids
Approximately 70% medium
Stain Blockers
SB1—"FX661"*, Principal ingredient Methacrylic Acid Resin
Sold by 3M Specialty Chemicals Division
SB2—"FX668F"* Principal ingredient Methacrylic Acid Resin
Sold by 3M Specialty Chemicals Division
SB3—"FX369"* Principal ingredient Phenolic-Resin
Sold by 3M Speciality Chemicals Division
SB4—"Algard NS"* Principal ingredient a Phenolic Resin
Sold by Hydrolabs Inc.
SB5—"SR300"* Principal ingredients Styrene-Maleic Anhydride Co-Polymer with a
Phenolic Resin
Sold by Dupont Flooring Systems
* Trade-mark
Colloidal Sol Dispersions of Organosiloxane Co-Polymers
DA1—16.4% solids, about 200 to about 500 Angstroms particle size range
DA2—5.8% solids, about 10 to about 1,900 Angstroms particle size range
DA3—17.5% solids about 10 to about 900 Angstroms particle size range The following describes the test procedures followed in evaluating examples of this invention.

TESTING PROCEDURES

A. OIL REPELLENCY—According to AATCC Test Method 118-1983 and reported oil repellency values from '1' to '8' wherein '8' is the highest repellency value.

B. WATER REPELLENCY—Test specimens are prepared and conditioned as per AATCC 118-1983, Test liquids prepared and numbered according to Table 1

TABLE 1

| WATER REPELLENCY RATING NUMBER | COMPOSITION |
| --- | --- |
| 0 | 100% Distilled Water |
| 1 | 2% Isopropanol 98% Distilled Water |
| 2 | 5% Isopropanol 95% Distilled Water |
| 3 | 10% Isopropanol 90% Distilled Water |
| 4 | 20% Isopropanol 80% Distilled Water |
| 5 | 30% Isopropanol 70% Distilled Water |
| 6 | 40% Isopropanol 60% Distilled Water |
| 7 | 50% Isopropanol 50% Distilled Water |
| 8 | 60% Isopropanol 40% Distilled Water |

The test sample is placed on a flat horizontal surface and a single droplets of each test liquid '0' to '8' is applied by means of eye dropper to various points on the test sample. The droplets are observed for 3 minutes. If no penetration or wetting of the fabric at the liquid-fabric interface and no wicking around the drop occurs, a drop of the next highest number test liquid is place at an adjacent site on the fabric and observed for 3 minutes. This process is continued until one of the test liquid shows obvious wetting of the fabric under or around the drop within 3 minutes. The repellency rating of a fabric is the highest number test liquid which will not wet the fabric within a 3 minute period ('8' is the highest repellency value).

C. SOIL REPELLENCY—Applicable to high pile substrates only such as carpeting and flocked materials. Samples are pre-conditioned for 48 hrs. at 70° F. and 65% relative humidity before testing. The test sample is placed in a cylinder with the back of the sample against the inside of the cylinder surface and the cylinder measuring 10 inches in diameter by 18 inches in length and closed at one end. Prepared soil in the amount of 20 grams is evenly distributed over the sample surface while manually rotating the cylinder. A total of 30 hard rubber balls measuring 0.75 inches in diameter are place in the cylinder and the cylinder is sealed. The cylinder is then placed on a motorized drum roller and caused to rotate at 50 RPM in one direction for 10 minutes and in the reverse direction for an additional 10 minutes. The sample is removed at the end of the 20 minute cycle and vacuumed cleaned so as to provide one complete vacuuming in each of 4 directions.

The sample is evaluated according to AATCC Test Method 121-1982 by comparing to an unsoiled standard sample of the same material using gray scale for colour change where in a "5" rating represents no soiling and a "1" rating represents heaviest soiling and a difference between two rating of 0.5 or greater is considered significant.

The soil was prepared according to AATCC Test Method 123-1982 with the addition of 0.5% by weight carbon black. A sufficient quantity was prepared in a single batch to complete all test requirements.

The following examples will illustrate the invention in more detail without limiting it.

EXAMPLE #1

A quantity of 100% nylon tufted carpet material (1/10 gauge, 26 oz/square yard loop pile) was scoured in a hot water bath at 180° F., at a 35 to 1 liquor ratio for 20 minutes, to simulate dying, then rinsed, extracted, dried and conditioned at 70° F. and 65% relative humidity for 24 hours and designated Sub. #1, and a portion retained as reference material for soil repellency tests.

Further portions of Sub. #1 were then impregnated in a low wet pick up padding method resulting in 50% wet pick up for each of the following treating solutions compositions and subsequently dried at 235° F. in a forced air oven and further conditioned at 70° F. and 65% relative humidity for 48 hours before testing as previously documented.

The composition by weight for each component of the treating solution was as follows in Table 2:

TABLE 2

| SAMPLE NO. | TREATING SOLUTION 'A' COMPOSITION BY WEIGHT | % owg of textile agent | Comparative % owg fluorochemical reduction |
|---|---|---|---|
| #1 | 100 parts water | 0.00% | standard |
| #2 | 1.80 parts F1<br>98.80 parts water | F1 = 0.90% | N/A |
| #3 | 1.20 parts F1<br>98.80 parts water | F1 = 0.60% | #2 to #3 = 33% |
| #4 | 1.20 parts F1<br>1.50 parts DA1<br>97.30 parts water | F1 = 0.60%<br>DA1 = 0.75% | #2 to #4 = 33% |
| #5 | 0.72 parts F1<br>99.28 parts water | F1 = 0.36% | #3 to #5 = 40% |
| #6 | 0.72 parts F1<br>1.50 parts DA1<br>97.28 parts water | F1 = 0.36%<br>DA1 = 0.75% | #3 to #6 = 40% |
| #7 | 0.43 parts F1<br>99.57 parts water | F1 - 0.22% | #5 to #7 = 39% |
| #8 | 0.43 parts F1<br>1.00 parts DA1<br>98.57 parts water | F1 = 0.22%<br>DA1 = 0.50% | #5 to #8 = 39% |
| #9 | 1.20 parts F1<br>4.00 parts DA2<br>94.80 parts water | F1 = 0.60%<br>DA2 = 2.00% | #2 to #9 = 33% |
| #10 | 1.20 parts F1<br>1.40 parts DA3<br>97.40 parts water | F1 = 0.60%<br>DA3 = 0.70% | #2 to #10 = 33% |
| #11 | 1.20 parts F2<br>98.80 parts water | F2 = 0.60% | N/A |
| #12 | 0.70 parts F2<br>99.30 parts water | F2 = 0.35% | #11 to #12 = 42% |
| #13 | 0.70 parts F2<br>1.50 parts DA1<br>97.80 parts water | F2 = 0.35%<br>DA1 = 0.75% | #11 to #13 = 42% |
| #14 | 1.20 parts F3<br>98.80 parts water | F3 = 0.60% | N/A |
| #15 | 0.70 parts F3<br>99.30 parts water | F3 = 0.35% | #14 to #15 = 42% |
| #16 | 0.70 parts F3<br>1.50 parts DA2<br>97.80 parts water | F3 = 0.35%<br>DA2 = 0.75% | #14 to #16 = 42% |
| #17 | 1.20 parts F4<br>98.80 parts water | F4 = 0.60% | N/A |
| #18 | 0.70 parts F4<br>99.30 parts water | F4 = 0.35% | #17 to #18 = 42% |
| #19 | 0.70 parts F4<br>4.00 parts DA3<br>95.30 parts water | F4 = 0.35%<br>DA3 = 2.00% | #17 to #19 = 42% |
| #20 | 1.20 parts F5<br>98.80 parts water | F5 = 0.60% | N/A |
| #21 | 0.70 parts F5<br>99.30 parts water | F5 = 0.35% | #20 to #21 = 42% |
| #22 | 0.70 parts F5<br>1.50 parts DA1<br>97.80 parts water | F5 = 0.35%<br>DA1 = 0.75% | #20 to #22 = 42% |

The treated samples were identified such that Solution #1 was applied to sample #1 and so on. Percent on weight of substrate is expressed as % of weight on goods (% owg). N/A means not applicable.

The results of tests performed on each sample are shown in Table #3, tests were performed as previously described herein.

TABLE 3

| SAMPLE NO. | WATER REPELLENCY | OIL REPELLENCY | SOIL REPELLENCY |
|---|---|---|---|
| #1 | 0 | NONE | 1 |
| #2 | 6 | 7 | 3.8 |
| #3 | 5 | 5 | 3.1 |
| #4 | 6 | 7 | 3.7 |

TABLE 3-continued

| SAMPLE NO. | WATER REPELLENCY | OIL REPELLENCY | SOIL REPELLENCY |
|---|---|---|---|
| #5 | 3 | 3 | 2.4 |
| #6 | 4 | 6 | 3.2 |
| #7 | 2 | 1 | 2.0 |
| #8 | 3 | 3 | 2.7 |
| #9 | 6 | 6 | 3.8 |
| #10 | 6 | 7 | 3.5 |
| #11 | 6 | 5 | 3.3 |
| #12 | 4 | 5 | 2.5 |
| #13 | 4 | 5 | 3.7 |
| #14 | 5 | 4 | 2.9 |
| #15 | 2 | 2 | 2.2 |
| #16 | 4 | 4 | 3.5 |
| #17 | 5 | 6 | 3.3 |
| #18 | 3 | 2 | 2.3 |
| #19 | 5 | 5 | 3.5 |
| #20 | 4 | 6 | 3.0 |
| #21 | 3 | 4 | 2.5 |
| #22 | 4 | 6 | 3.5 |

EXAMPLE #2

A quantity of 100% dyed nylon tufted cut pile carpet material (⅛ gauge, 48 oz./square yard) was cut into samples, weighed, identified and applied with treating solution compositions as per Table #4 in a two step ('A' then 'B') process as follows:

Treating solutions 'A' as per Table #4 were adjusted to a pH of 2.5 to 3.5 and applied at 350% WPU, steamed at 210F for 60 seconds, extracted to about 40% wet content and further applied with topical spray applications of treating solutions 'B' as set out in Table #4 at 15% WPU, based on the dry weight of carpet then dried at 235° F. The samples were then conditioned and tested as previously documented and the results set out in Table #5. The reference for soil repellency evaluation in each case was the untreated, unsoiled carpet material.

TABLE #4

| SAMPLE NO. | TREATING SOLUTION 'A' COMPOSITION BY WEIGHT | TREATING SOLUTION 'B' COMPOSITION BY WEIGHT | COMPARATIVE %OWG FLURORCHEMICAL REDUCTION |
|---|---|---|---|
| 23 | 0.75 parts SB1 99.25 parts water | 4.0 parts F1 96.0 parts water | N/A |
| 24 | 0.75 parts SB1 99.25 parts water | 2.0 parts F1 98.0 parts water | #23 to #24 = 50% |
| 25 | 0.75 parts SB1 0.08 parts DA1 99.17 parts water | 2.0 parts F1 98.0 parts water | #23 to #25 = 50% |
| 26 | 0.75 parts SB1 0.30 parts DA1 98.95 parts water | 1.8 parts F1 98.2 parts water | #23 to #26 = 55% |
| 27 | 0.75 parts SB1 0.60 parts DA1 98.65 parts water | 2.0 parts F1 98.0 parts water | #23 to #27 = 50% |
| 28 | 0.03 parts SB1 0.20 parts DA1 99.77 parts water | 1.6 parts F1 98.4 parts water | #23 to #28 = 60% |
| 29 | 0.75 parts SB2 99.25 parts water | 4.0 parts F2 96.0 parts water | N/A |
| 30 | 0.75 parts SB2 99.25 parts water | 2.0 parts F2 98.0 parts water | #29 to #30 = 50% |
| 31 | 0.75 parts SB2 0.60 parts DA2 98.65 parts water | 2.0 parts F2 98.0 parts water | #29 to #31 = 50% |
| 32 | 0.75 parts SB3 99.25 parts water | 4.0 parts F3 96.0 parts water | N/A |
| 33 | 0.75 parts SB3 99.25 parts water | 2.0 parts F3 98.0 parts water | #32 to #33 = 50% |
| 34 | 0.75 parts SB3 0.30 parts DA3 98.95 parts water | 2.0 parts F3 98.0 parts water | #32 to #34 = 50% |
| 35 | 0.75 parts SB4 99.25 parts water | 4.0 parts F4 96.0 parts water | N/A |
| 36 | 0.75 parts SB4 99.25 parts water | 2.0 parts F4 98.0 parts water | #35 to #36 = 50% |
| 37 | 0.75 parts SB4 0.30 parts DA1 98.95 parts water | 2.0 part F4 98.0 parts water | #35 to #37 = 50% |
| 38 | 0.75 parts SB5 99.25 parts water | 4.0 parts F5 96.0 parts water | N/A |
| 39 | 0.75 parts SB5 99.25 parts water | 2.0 parts F5 98.0 parts water | #38 to #39 = 50% |
| 40 | 0.75 parts SB5 0.60 parts DA2 98.65 parts water | 2.0 parts F5 98.0 parts water | #38 to #40 = 50% |
| 41 | 100 parts water | 100 parts water | STANDARD |

TABLE #5

| SAMPLE NO. | WATER REPELLENCY | OIL REPELLENCY | SOIL REPELLENCY |
|---|---|---|---|
| 23 | 5 | 6 | 3.5 |
| 24 | 3 | 4 | 3.2 |
| 25 | 6 | 5 | 3.7 |
| 26 | 6 | 7 | 3.8 |
| 27 | 5 | 7 | 4.2 |
| 28 | 5 | 5 | 3.5 |
| 29 | 5 | 5 | 3.5 |
| 30 | 3 | 3 | 2.8 |
| 31 | 5 | 6 | 3.9 |
| 32 | 6 | 5 | 3.1 |
| 33 | 4 | 3 | 2.0 |
| 34 | 6 | 6 | 4.0 |
| 35 | 6 | 7 | 3.4 |
| 36 | 4 | 4 | 2.5 |
| 37 | 6 | 7 | 4.2 |
| 38 | 6 | 6 | 3.4 |
| 39 | 3 | 3 | 2.4 |
| 40 | 6 | 6 | 3.8 |
| 41 | 0 | NONE | 1 |

EXAMPLE #3

A quantity of Multifiber Test Fabric No. 10A as specified in various AATCC Test Methods was used in the following samples to represent a range of common fibre types namely:

Spun Acetate=Fibre Type A

Bleached Cotton=Fibre Type B

Spun Nylon 6.6=Fibre Type C

Spun Dacron 54=Fibre Type D

Spun Orlon 75=Fibre Type E

Worsted Wool=Fibre Type F

Samples of Multifiber Test Fabric were scoured as in Example #1, dried and slit into ribbons of individual fibre type and applied with treating solutions of compositions as set out in Table #6 by means of low wet pick up padding at 20% wet pick up on weight of material. The fabric was then dried at 235° F. and conditioned for 48 hours at 70° F. and 65% relative humidity before testing as previously described herein. The tests results are set out in Table #7.

TABLE #6

| SAMPLE NO. | TREATING SOLUTION 'A' COMPOSITION BY WEIGHT | % OWG OF TEXTILE AGENT | COMPARATIVE % OWG FLURORCHEMICAL REDUCTION |
|---|---|---|---|
| 42 | 3.0 parts F1<br>97.0 parts water | F1 = 0.60% | N/A |
| 43 | 1.8 parts F1<br>98.2 parts water | F1 = 0.36% | #42 to #43 = 40% |
| 44 | 1.8 parts F1<br>2.5 parts DA1<br>96.7 parts water | F1 = 0.36%<br>DA1 = 0.50% | #42 to #44 = 40% |
| 45 | 3.0 parts F3<br>97.0 parts water | F3 = 0.60% | N/A |
| 46 | 1.8 parts F3<br>98.2 parts water | F3 = 0.30% | #45 to #46 = 40% |
| 47 | 1.8 parts F3<br>7.0 parts DA2<br>91.2 parts water | F3 = 0.30%<br>DA2 = 1.40% | #45 to #47 = 40% |
| 48 | 3.0 parts F5<br>97.0 parts water | F5 = 0.60% | N/A |
| 49 | 1.8 parts F5<br>98.2 parts water | F5 = 0.36% | #48 to #49 = 40% |
| 50 | 1.8 parts F5<br>2.5 parts DA1<br>96.7 parts water | F5 = 0.36%<br>DA1 = 0.50% | #48 to #50 = 40% |

TABLE #7

| TEST: | WATER REPELLENCY | | | | | | OIL REPELLENCY | | | | | |
|---|---|---|---|---|---|---|---|---|---|---|---|---|
| FIBER TYPE | A | B | C | D | E | F | A | B | C | D | E | F |
| SAMPLE #42 | 5 | 5 | 7 | 6 | 6 | 7 | 6 | 4 | 6 | 6 | 6 | 7 |
| SAMPLE #43 | 4 | 3 | 5 | 5 | 4 | 6 | 4 | 3 | 4 | 4 | 4 | 5 |
| SAMPLE #44 | 5 | 5 | 7 | 6 | 7 | 8 | 6 | 5 | 7 | 6 | 6 | 8 |
| SAMPLE #45 | 4 | 5 | 6 | 5 | 5 | 6 | 4 | 5 | 5 | 4 | 5 | 5 |
| SAMPLE #46 | 3 | 3 | 4 | 4 | 4 | 5 | 3 | 3 | 4 | 3 | 4 | 4 |
| SAMPLE #47 | 4 | 4 | 6 | 5 | 5 | 7 | 4 | 6 | 5 | 5 | 5 | 6 |
| SAMPLE #48 | 5 | 5 | 6 | 6 | 4 | 5 | 5 | 4 | 5 | 5 | 6 | 6 |
| SAMPLE #49 | 4 | 3 | 4 | 5 | 3 | 4 | 3 | 2 | 3 | 3 | 4 | 5 |
| SAMPLE #50 | 5 | 4 | 7 | 6 | 6 | 5 | 5 | 4 | 6 | 6 | 6 | 6 |

EXAMPLE #4

A quantity of finished 100% nylon, tufted cut pile carpet material (⅛ gauge, 48 oz. per square yard) and an 80/20 wool-nylon blend, woven cut pile carpet material were cut into samples, weighed, identified as 'N' for nylon and 'W' for wool-nylon blend along with sample No. and applied with topical spray applications at 20% wet pick up on weight of goods of treating solutions at a pH of 4.0 and of compositions as set out in Table 8.

The samples were then dried at 235° F., conditioned and tested as previously documented with the results set out in Table 9. The reference for soil repellency evaluation in each case was the untreated, unsoiled finished carpet.

TABLE 8

| SAMPLE NO. | TREATING SOLUTION 'A' COMPOSITION BY WEIGHT | % OWG OF TEXTILE AGENT | COMPARATIVE % OWG FLURORCHEMICAL REDUCTION |
|---|---|---|---|
| 51W & 51N | 3.0 parts F1<br>0.5 parts SB2<br>96.5 parts water | F1 = 0.60%<br>SB2 = 0.10% | N/A |
| 52W & 52N | 1.5 parts F1<br>0.5 parts SB2<br>98.0 parts water | F1 = 0.30%<br>SB2 = 0.10% | #51 to #52 = 50% |
| 53W & 53N | 1.5 parts F1<br>0.5 parts SB2<br>3.0 parts DA1<br>95.0 parts water | F1 = 0.30%<br>SB2 = 0.10%<br>DA1 = 0.60% | #51 to #52 = 50% |
| 54W & 54N | 2.0 parts F1<br>10.0 parts SB2<br>3.0 parts DA1<br>85.0 parts water | F1 = 0.40%<br>SB2 = 2.00%<br>DA1 = 0.60% | #51 to #54 = 33% |

TABLE 9

| SAMPLE NO. | WATER REPELLENCY | OIL REPELLENCY | SOIL REPELLENCY |
|---|---|---|---|
| 51W | 7 | 7 | 3.9 |
| 52W | 4 | 5 | 3.5 |
| 53W | 7 | 8 | 4.0 |
| 54W | 7 | 8 | 4.0 |
| 51N | 6 | 6 | 3.7 |
| 52N | 4 | 4 | 3.1 |
| 53N | 6 | 7 | 4.1 |
| 54N | 5 | 6 | 4.2 |

In summary, from the above tests, the results obtained from Examples #1 through #4 demonstrate that when synthetic or natural fibres are applied with the herein described organosiloxane co-polymers and either A) subsequently applied with a fluorochemical in a further process or B) simultaneously co-applied with a fluorochemical in a one step process; said described organosiloxane co-polymers provide for substantial reductions in the amount of fluorochemical otherwise (normally) required to impart oil, water and soil repellency of equivalent performance values.

It is also demonstrated in Examples #2 and #4 that said described organosiloxane co-polymers when co-applied with textile agents, described as stain blockers, to a synthetic or natural fibre and A) subsequently applied with a fluorochemical in a further second step, or B) is co-applied with a fluorochemical in a one step process. The resulting decrease in fluorochemical otherwise (normally) required to impart oil, water, and soil repellency is even further reduced over that previously observed.

Thus there has been provided in accordance with the invention a method and composition for treating fibrous substrates to impart oil, water and dry soil repellency that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A method of treating fibrous substrates to thereby impart oil, water and dry soil repellency at substantially reduced add on levels of fluorochemical resins based on the weight of a fibrous substrate so treated, the method comprising the steps of applying to the substrate an aqueous treating medium comprising the following admixture:
  (a) 0.1 to 35 parts by weight of an aqueous colloidal sol dispersion containing from about 5% to about 26% by weight of discrete solid organosilsesquioxane co-polymer particles consisting of units selected from the group consisting of $R\,SiO_{3/2}$, $R'_2SiO$, and $R''_3SiO_{1/2}$ units, wherein each R, R' and R" radical is selected from the group consisting of hydrocarbon containing from 1 to 7 carbon atoms, the co-polymer particles having an overall particle size of from about 10 Angstroms to about 2000 Angstroms in a sufficient amount to yield from 0.04% to 0.32% solids based on the weight of the fibrous substrate to which it is applied;
  (b) from 0.00 to about 0.96 parts by weight of solids of fluorochemical resins selected from the group of liquids containing at least one dispersed or emulsified fluorine containing resin, added as aqueous fluorochemical dispersion or emulsion wherein the fluorine content of the resin is from about 15% to 50% by weight in a sufficient amount to yield from about 100 parts per million to about 500 parts per million fluorine atoms by weight on the fibre; and
  (c) 64.04 parts to 99.9 parts by weight of a diluent, and then heating the fibrous substrate to cause curing of fluorochemical resin components so applied.

2. A method according to claim 1 wherein the diluent is water.

3. A method according to claim 1 wherein the heating takes place at a temperature of at least 200° F. for a minimum of 20 seconds.

4. A method according to claim 1 wherein no fluorochemical resin is included in the aqueous treating medium applied to the fibrous substrate, and wherein the method comprises the further step, after the heating step, of applying a further treating medium to the fibrous substrate, this medium comprising an aqueous fluorochemical resin dispersion or emulsion wherein the fluorine content of the resin is from about 15% to 50% by weight in sufficient amount to yield between about 100 parts per million and about 500 parts per million fluorine atoms by weight on the fibrous substrate to which it is applied.

5. A method according to claim 4 wherein, after application of the second treating medium, the fibrous substrate is subjected to further heating at a temperature greater than 200° F. for a time sufficient to cause curing of the fluorochemical resins so applied.

6. A method according to claim 4 wherein, incorporated in the diluent, is an effective amount of textile agent selected from the group consisting of, stain blockers, and spin finish.

7. A method according to claim 4 wherein the aqueous treating medium containing the colloidal sol dispersion is applied in an amount of about 5% to about 400% by weight wet pickup.

8. A method according to claim 1 wherein the aqueous treating medium containing the colloidal sol dispersion is applied in an amount of about 5% to about 400% by weight wet pickup.

9. A method according to claim 1 wherein the fibrous substrate is subjected to a temperature greater than 235° F. for a time sufficient to cause curing of any fluorochemical resins.

10. A composition for treating fibrous substrates to thereby impart oil, water and dry soil repellency at substantially reduced add on levels of fluorochemical resins based on weight of the fibrous substrate so treated, the composition comprising the following admixture:
  (a) 0.1 to 35 parts by weight of an aqueous colloidal dispersion containing from about 5% to about 26% discrete solid organosilsesquioxane co-polymer particles having units selected from the group consisting of $R\,SiO_{3/2}$, $R'_2SiO$ and $R''_3SiO_{1/2}$ units, wherein each R, R' and R" radical is selected from the group consisting essentially of hydrocarbon radicals containing from 1 to 7 carbon atoms, the co-polymer particles having an overall particle size range of from about 10 Angstroms to about 2000 Angstroms in a sufficient amount to yield from 0.04% to 0.32% solids based on the weight of the fibrous substrate to which it is applied;
  (b) from 0.00 to about 0.96 parts by weight of solids of fluorochemical resins selected from the group of liquids containing at least one dispersed emulsified fluorine containing resin, added as an aqueous fluorochemical dispersion or emulsion wherein the fluorine content of the resin is from about 15% to 50% by weight in a sufficient amount to yield from about 100 parts per million to about 500 parts per million fluorine atoms by weight on the fibre; and
  (c) 64.04 parts to 99.9 parts by weight of a diluent.

11. A composition according to claim 10 wherein the fluorochemical resin content is 0 and further comprising an effective amount of textile agents selected from the group comprising non-fluorine containing stain blockers and non-fluorine containing spin finish.

12. A fibrous substrate to which has been applied a composition according to claim 10, the resin components thereof having been cured after application.

13. A method according to claim 4 wherein in said admixture is further incorporated an effective amount of a non-fluorine containing stain blocking agent.

14. A method according to claim 4 wherein in said admixture is further incorporated an effective amount of a non-fluorine containing spin finish composition.

15. A method according to claim 4 wherein in said diluent admixture is further incorporated an effective amount of a non-fluorine containing stain blocking phenolic resin.

16. A method according to claim 4 wherein in said admixture is further incorporated an effective amount of a non-fluorine containing stain locking methacrylic acid resin.

17. A method according to claim 4 wherein in said admixture is further incorporated an effective amount of a non-fluorine containing styrene-maleic anhydride co-polymer stain blocking agent.

18. A composition according to claim 11 wherein the stain blocker is selected form the group comprising phenolic resin, methacrylic acid resin and styrene-maleic anhydride co-polymer.

19. A method according to claim 6, comprising the further step of curing the fluorochemical resin components after application.

* * * * *